(No Model.) 2 Sheets—Sheet 1.
H. S. FIRMAN.
VACUUM EVAPORATING APPARATUS.
No. 438,266. Patented Oct. 14, 1890.
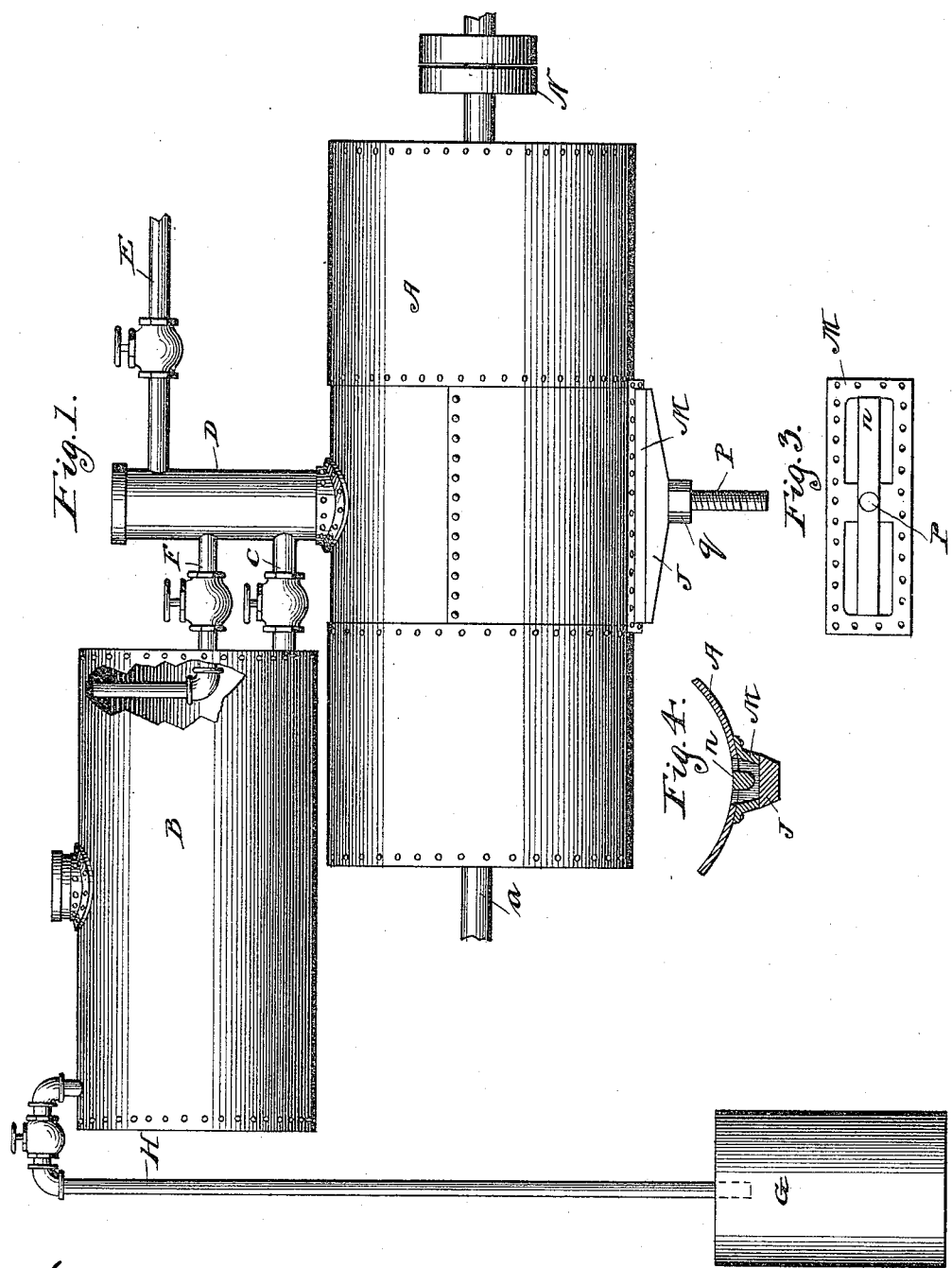

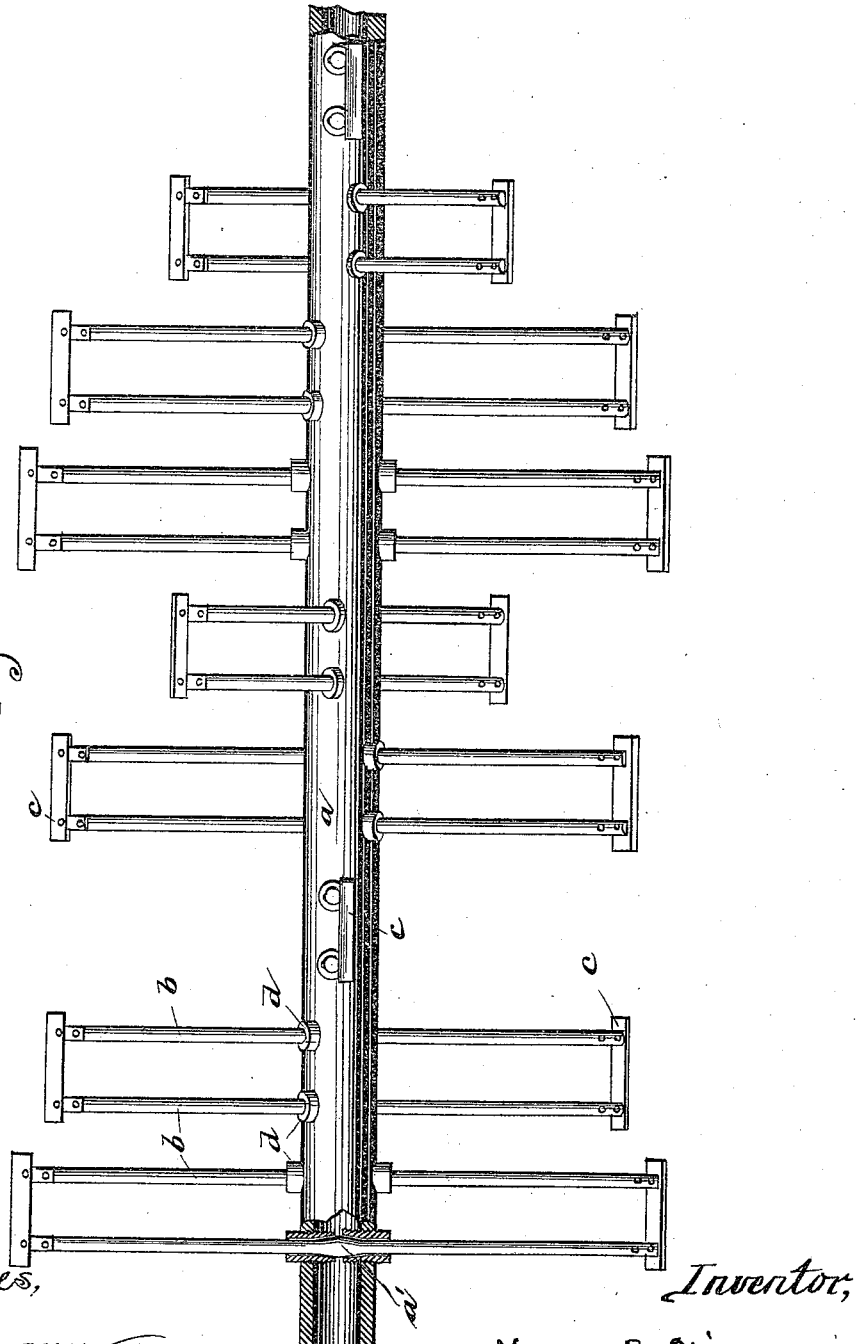

UNITED STATES PATENT OFFICE.

HENRY S. FIRMAN, OF CHICAGO, ILLINOIS.

VACUUM EVAPORATING APPARATUS.

SPECIFICATION forming part of Letters Patent No. 438,266, dated October 14, 1890.

Application filed September 10, 1887. Renewed March 17, 1890. Serial No. 344,237. (No model.)

*To all whom it may concern:*

Be it known that I, HENRY S. FIRMAN, a citizen of the United States, residing in the city of Chicago, county of Cook, and State of Illinois, have invented certain new and useful Improvements in Vacuum Evaporating Apparatus, which I desire to secure by Letters Patent of the United States, and of which the following is a specification.

My invention relates to apparatus for treating various kinds of material—such as, for example, sugar-cane, sorghum, and saps for obtaining sugar and sirups, organic refuse, excrementitious matters, blood, meat, lime, white lead and paints, paper-pulp, wood pulp, salt-brine, soda-ash liquor, fish-scrap, "tank-water," and all ammoniacal and other liquids and residuums from abattoirs and packing-houses—evaporating the water from the same and granulating and pulverizing them when desired, and mixing them with other materials; also, for the treatment of bones and phosphate rock and other substances for the production of phosphoric acids, or to render the same soluble.

The following is a description of my invention, reference being had to the accompanying drawings, in which—

Figure 1 is a side elevation. Fig. 2 is a detailed enlarged view of mechanism in the heating-cylinder. Fig. 3 is a plan of a supplementary chamber attached beneath the principal cylinder. Fig. 4 is a transverse section of the latter.

The process of treating the various articles named involves the operation of heating and stirring in addition to any chemical treatment that may be employed.

As a heating and vacuum chamber I provide a large cylinder A, in connection with which I also provide one or more auxiliary cylinders B, communicating one with the other, as shown, in which a dome or vertical extension D is mounted on cylinder A, which partly serves to form said connection. Dome D, by the addition of pipe-connections C, which latter are provided with suitable stop-cocks, forms a communication between cylinders A and B. A pipe E, provided with a valve or stop-cock, is designed to connect with the dome for the purpose of exhausting the air from the cylinder.

A means for exhausting the air from cylinder B is provided by the upper tube F, the end of which within the boiler terminates near the upper portion of the latter, as shown exposed where the portion of the cylinder is broken out. Pipe F is also suitably provided with a stop-cock.

The auxiliary cylinder or cylinders B have several functions, one of which is to serve as a receptacle for any kind of material requiring chemical or other treatment or manipulation before passing into the main cylinder for final treatment. In another capacity they serve as a reservoir or reservoirs in which to "ripen," chemically speaking, any material that may require such ripening before final treatment. They also serve to receive any liquid which foaming or ebullition may force from the main cylinder when heat is applied to the latter, which foaming or ebullition occasionally happens at the commencement of operations, the liquid thus expelled partly or wholly flowing back when excessive ebullition ceases.

The cylinder B is provided with a vent (represented by pipe H) leading to a waste-receptacle G, for any redundancy in the cylinder or overflow therefrom. This vent admits air and thus permits the flow or ebullition of liquid from the main cylinder to the auxiliary cylinder to return. The provision of stop-cocks permits the exhaust to be applied to the main cylinder only when desired, and a vacuum or partial vacuum produced therein, or the vacuum may be at the same time produced in all the cylinders or in one only.

The mechanism shown in the enlarged view Fig. 2 relates to the interior operations of the main cylinder, by which the contents thereof are heated and stirred. A tubular shaft $a$ extends longitudinally through cylinder A, with suitable bearings at each end of said cylinder to permit of rotation of the shaft and at the same time form a tight joint. The journal-bearings of shaft $a$ in the ends of the cylinder may be of any convenient form to afford easy rotation of said shaft, though I prefer to provide bearings other than the cylinder-walls, in order that an air-tight packing may more conveniently be supplied.

I find that in the treatment of the several articles heretofore enumerated a constant stirring in addition to heat is important. To agitate the contents of the cylinder, the arms $b$ are provided. I find that to properly secure these arms to the shaft $a$ it is preferable to extend them through the shaft, ends of equal length extending from opposite sides of said shaft. It is also, for their stability, important to properly secure the arms within the shaft. For this purpose the apertures through the shaft are greater in diameter than the diameter of the arms, and bushings $d$ are inserted. The latter are screw-threaded, and suitable threads are provided in the apertures of the shaft to receive them. Arms $b$ are preferably solid metal cylindrical rods turned down or reduced in diameter from the middle each way, leaving a central enlargement that will pass through the apertures in the shaft. Orifices in the bushings fit the arms closely. By bringing the arms with the central enlargement within the hollow of the shaft and inserting the bushings into the apertures surrounding the arms (specially illustrated at $a'$, Fig. 2) and tightening against the enlargement, it is obvious that a very secure joint is the result. Arms $b$, as an important feature, are arranged in pairs, which at their extremities are coupled together by bars $c$. These bars obviate any liability of the arms to turn on their longitudinal axes, which would tend to unscrew the bushing. It has heretofore been the custom to brace the arms in order to obtain the necessary stability.

By the construction and application of arms as I apply them, in connection with the construction and application of the bars $c$, very important results are attained. Numerous angles and parts are avoided, upon and by reason of which the material as a result would adhere, the apparatus become thoroughly clogged, and the movement of the arm so far obstructed as to render the apparatus impracticable. That the bars $c$ may contribute their part in strengthening the stirring mechanism they are securely riveted, respectively, to the ends of each pair of arms, Arms $b$ are so arranged upon shaft $a$ that the axis of movement of said shaft is equally represented radially in every direction—that is, the arms are so disposed that the general radiation throughout the length of the shaft shall be equal, and thus prevent a greater number of arms being engaged at one time than at another in their passage through the mass of material being operated upon, which is quite important, as a jerking movement would result from unequal distribution of said arms.

I find that the material in cylinder A, as it is forced around the interior thereof by the revolving arms, has a tendency to form into masses or balls. When these masses are once formed it is very difficult to break them up, and it is impossible to satisfactorily treat or dry the material while in this form. I have therefore devised a means for arresting this tendency and of breaking up the balls when formed. For this purpose I arrange, preferably beneath the cylinder A, a U-shaped chamber connecting with the interior of said cylinder A, which is shown secured to the latter and designated M. To provide for the application of this chamber the cylinder wall is properly cut away and a frame riveted thereto, which latter is shown in plan in Fig. 3 and in cross-section in Fig. 4. This frame is preferably cast in one piece, embracing the border sections provided with rivet-holes and the longitudinal central bar $n$ and the central transverse portion uniting the sides and bar $n$. To this central portion is secured a pendent screw-bolt $p$ and the nut $q$, suitable to engage therewith. By means of the screw-bolt and nut aforesaid a movable plate J is secured beneath the chamber and serves to close the latter. The chamber M preferably embraces a considerable portion of the length of the cylinder. As the shaft $a$ revolves, carrying with it the arms, the balls or lumps of material that form within the cylinder are forced down through the opening on one side of the bar $n$ of the chamber and out into the cylinder again at the other opening, which serves to break the mass or lumps, the arms also being more effective for that purpose while the balls are entering and leaving the chamber. A number of bars $n$ may be employed when desired. The passage of the aggregation of particles or balls through the chamber M is effected by the crowding of the superimposed material acting from above under the pressure of the revolving arms. As said arms revolve they tend to urge the material around the cylinder in the direction of their movement, and as the material, acting under the law of gravity, seeks the bottom portion of the cylinder (in which chamber M is preferably located) it will, under the influence of these combined forces, seek escape through the first opening into this chamber. As the pressure is away from instead of into the opposite opening of the chamber, the material in the chamber will emerge from this opening acting under the pressure of the incoming material and pass up into the main cylinder. As before stated, the lumpy particles or balls will be broken up by contact with the angles of the walls of this chamber and by the bars therein located.

For the purpose of heating the cylinder A, I provide it with a steam-tight jacket, covering all or a portion of said cylinder, into which steam is admitted from any convenient boiler. As an auxiliary means of heating this cylinder when a higher temperature is desired, I also provide a furnace (or heat from the boiler-furnace may be used) from which, by means of a pipe leading to one end of shaft $a$, heat is introduced to the latter, the connection of said pipe and shaft being such as not to interfere with a free rotary movement of said shaft. A vent or a draft is furnished by the opposite end of the shaft, which is left open. By means of the hollow shaft, and by reason of passing heat throughout its interior to which the middle portion of the arms is exposed, the latter may be by conduction heated throughout their length to any desirable degree.

With the construction as shown in the present example, the dome D serves as the man-hole through which the material is supplied to the cylinder or an independent man-hole may be provided.

The discharge of material from the cylinder is effected by loosening plate J and turning it to a position at right angles to its normal position, when openings in chamber M at each side of said plate afford the desired passage.

The apparatus is equally applicable to the treatment of material that has previously been chemically treated or to material which does not require any such preliminary treatment, as well as to material that may require chemical treatment simultaneously with vacuum and other treatment.

In the management of the apparatus the material to be treated is placed in the cylinder A, and the man-hole properly closed. Steam is then turned into the jacket, and when a higher temperature is needed than is thus produced the furnace heat is admitted to shaft $a$. The latter, with its arms, is then put into a rotary motion by means of a pulley N. The desired vacuum is then produced in the cylinder by the means set forth.

In the foregoing description is embodied a vacuum apparatus in which I have very effectually obviated the difficulties heretofore encountered in stirring the material—that is to say, the construction of arms as heretofore applied supported by braces and offering as they do so much surface for adhesion of the inclosed mass, soon so clog the stirring mechanisms as to prevent successful operation. In the construction of my apparatus I am, by the method adopted of securing the arms, enabled to dispense with braces and in connection therewith, by using the rounded or cylindrical form of the shaft, arms, and bars, successfully prevent clogging, and also thereby lessen resistance and as a consequence the expense of operating the apparatus.

Having thus described my invention, what I claim is—

1. In a vacuum apparatus, the combination, with the cylinders A and B, the latter located above the former, of a dome D, mounted on cylinder A, an exhaust-pipe E, a pipe C, connecting the dome and cylinder B, a pipe F, also connecting the dome and upper cylinder and terminating on the interior of the latter near its top, whereby exhaust may be effected, pipe H and receptacle G, said pipes C and F being provided with stop-cocks, and all arranged to operate substantially as set forth.

2. In a vacuum apparatus, the combination of cylinder A, rotatable tubular shaft $a$, extending longitudinally and centrally through said cylinder, arms $d$, consisting of solid metal rods having central enlargements, said rods being inserted through shaft $a$ and projecting radially therefrom in pairs, bars $c$, whereby said rods are coupled or joined in pairs, and bushings $d$, whereby to secure said arms to the shaft, substantially as described.

3. In a vacuum apparatus, the combination of a cylinder to contain the material under treatment, a shaft adapted to rotate within said cylinder, arms secured radially upon said shaft to operate upon the material, with a chamber located exteriorly of said cylinder and at or toward the bottom thereof and communicating therewith, one or more bars secured in the opening to the chamber and a removable bottom plate for said chamber, substantially as described.

4. In a vacuum apparatus, in combination with the cylinder A, to contain the material under treatment, a tubular shaft secured to rotate therein, and arms passing transversely through said shaft and extending radially therefrom, said shaft being connected at one end and outside of the cylinder with a source of heat, whereby heat is conducted throughout the length of the shaft and brought into direct contact with the central portions of said arms, substantially as described.

HENRY S. FIRMAN.

Witnesses:
JOSEPH RIDGE,
FREDERICK C. GOODWIN.